United States Patent [19]
Iwase et al.

[11] Patent Number: 6,087,044
[45] Date of Patent: *Jul. 11, 2000

[54] CARBON ELECTRODE FOR SECONDARY CELLS, A METHOD FOR MAKING THE SAME, AND A NONAQUEOUS ELECTROLYTE SECONDARY CELL COMPRISING THE CARBON ELECTRODE

[75] Inventors: Atsushi Iwase, Okazaki; Nozomu Okumura, Nagoya; Yoshitsugu Sakamoto, Kariya, all of Japan

[73] Assignee: Denso Corporation, Kariya, Japan

[*] Notice: This patent is subject to a terminal disclaimer.

[21] Appl. No.: 08/988,930

[22] Filed: Dec. 11, 1997

[30] Foreign Application Priority Data

Dec. 12, 1996 [JP] Japan ................................ 8-332357

[51] Int. Cl.[7] ................................................. H01M 4/60
[52] U.S. Cl. ........................................ 429/231.8; 429/213
[58] Field of Search .................................. 429/231.8, 213

[56] References Cited

U.S. PATENT DOCUMENTS 4,835,075   5/1989   Tajima et al. .
5,344,726   9/1994   Tanaka et al. .
5,494,762   2/1996   Isoyama et al. .

FOREIGN PATENT DOCUMENTS 4-368778   12/1992   Japan .
5-94838    4/1993    Japan .
5-78909    10/1993   Japan .
6-132027   5/1994    Japan .
8-31411    2/1996    Japan .

*Primary Examiner*—Maria Nuzzolillo
*Assistant Examiner*—Tracy Dove
*Attorney, Agent, or Firm*—Pillsbury Madison & Sutro LLP

[57] ABSTRACT

An electrode comprises an active substance therefor which is made of a shaped body of a carbon porous body and a low crystallinity or amorphous carbon layer formed on at least a part of surfaces of the carbon porous body. The carbon porous body further comprises crystalline carbon particles which are dispersed and held in the carbon porous body. A method for making the electrode and a nonaqueous electrolyte secondary cell comprising the electrode as a negative electrode are also described.

27 Claims, 5 Drawing Sheets

CARBON ELECTRODE FOR SECONDARY CELLS, A METHOD FOR MAKING THE SAME, AND A NONAQUEOUS ELECTROLYTE SECONDARY CELL COMPRISING THE CARBON ELECTRODE

BACKGROUND OF THE INVENTION

1. Field of the Invention

This invention relates to an electrode for secondary cells comprising a carbon material as an active substance for the electrode, and a method for making an electrode of the type mentioned above. The invention also relates to a nonaqueous electrolyte secondary cell comprising the electrode.

2. Description of the Prior Art

Recently, electrodes made of a carbon material as an active substance therefor have been frequently employed in order to obtain secondary cells having a high capacity and good charge and discharge cycle characteristics. For obtaining secondary cells having a higher capacity and better charge and discharge cycle characteristics, extensive studies have been made on carbon electrodes which have a high electrode capacity and good charge and discharge cycle characteristics.

For instance, Japanese Laid-open Patent Application No. 5-78909 proposes an electrode which is obtained by forming, on a porous ceramic substrate, a carbonaceous material which has a structure slightly disarranged on comparison with highly oriented carbon having a graphite crystal structure and also has a selective orientation. A secondary cell using this electrode exhibits a high capacity and good charge and discharge cycle characteristics. However, such a carbonaceous material can be formed only in the form of a thin film when using a chemical deposition (CVD) method, thus making it difficult to obtain the carbonaceous material in amounts sufficient for practical applications.

Japanese Laid-open Patent Application No. 5-94838 proposes a composite carbon material having a composite structure of the core and the skin layer, which is obtained by forming a carbonaceous skin layer having a specific value determined by the Raman spectroscopy on individual particulate or fibrous carbon cores according to a CVD method. However, it is difficult to obtain the composite carbon martial, wherein each core is fully covered with the carbonaceous material, within a short time and in an efficient manner. Thus, a difficulty is involved in industrial mass-production of an electrode by use of the composite carbon material.

In fact, we have made a follow-up test wherein while particulate or fibrous carbon cores are invariably fluidized by use of an agitated, fluidized bed in a rotary kiln, the skin layer of a carbonaceous material is formed on individual cores. As a result, it has been found that it takes a long time of several tens of hours before the skin layer of a carbonaceous material with a uniform thickness is formed. In addition, during the course of the formation of the skin layer, carbon bodies mutually coagulate, thereby forming coagulms having a larger size.

Where the larger-sized coagulms are divided into finer particles so as to utilize them as an electrode active substance, the carbon bodies may be broken at the core portion thereof, or the skin layer may be separated to expose the core thereat. Such exposed cores undesirably facilitate reaction with an electrolyte during charge and discharge cycles, so that the electrolyte is very likely to decompose. The decomposition of the electrolyte leads to the lowering of a charge and discharge repetition life (i.e. a charge and discharge cycle characteristic).

In order to shorten the formation time and to prevent the coagulation of the carbon bodies, the flow rate of a hydrocarbon gas is increased to allow good fluidization. As a result, it has been found that some of the carbon bodies are lost by scattering, thus resulting in the lowering of yield.

SUMMARY OF THE INVENTION

It is accordingly an object of the invention to provide an electrode for secondary cells which has a high electrode capacity and a good charge and discharge cycle characteristic.

It is another object of the invention to provide a method for simply making an electrode of the type mentioned above by mass production at low costs.

It is a further object of the invention to provide a nonaqueous electrolyte secondary cell which makes use of an electrode of the type mentioned above and can realize a high cell capacity and a good charge and discharge cycle characteristic.

We made intensive studies to solve the problems involved in prior art electrodes and nonaqueous electrolyte secondary cells. As a result, it was found that when using a composite carbon material, which was obtained by forming a low crystallinity or amorphous carbon layer on part or all of the surfaces of a carbon porous matrix, as an electrode active substance, an electrode was adapted for use in secondary cells as having a high electrode capacity and good charge and discharge cycle characteristics.

According to one embodiment of the invention, there is provided an electrode which comprises, as an active substance therefor, a shaped body of a carbon porous body and a low crystallinity or amorphous carbon layer formed on at least a part of surfaces of the carbon porous body.

The electrode of the invention can be formed, according to another embodiment of the invention, by a method for making an electrode for secondary cells wherein the electrode comprises an active substance made of a carbon porous body and a low crystallinity or amorphous carbon layer formed on at least a part of surfaces of the carbon porous body, the method comprising providing a resin molding in a desired form, carbonizing the molding by calcinination to obtain a carbon porous body, heating the carbon porous body in an atmosphere containing a carbonizable gas so that the carbonizable gas is thermally decomposed to permit a low crystallinity or amorphous carbon layer to be deposited or formed on at least a part of the surfaces of the carbon porous body.

According to a further embodiment of the invention, there is also provided a nonaqueous electrolyte secondary cell which comprises the electrode defined above. More specifically, a nonaqueous electrolyte secondary cell comprises at least a pair of electrodes, a separator provided between the at least a pair of electrodes, and a nonaqueous electrolyte impregnated in the separator, wherein a negative electrode comprises, as an active substance therefor, a shaped body of a carbon porous body and a low crystallinity or amorphous carbon layer formed on at least a part of surfaces of the carbon porous body.

It will be noted that the term "at least a part of the surfaces" used herein is intended to mean not only outermost surfaces of the carbon porous body, but also inner surfaces of pores or voids in the carbon porous body, which are in communication with outside.

When using an electrode of the invention in secondary cells, the cells exhibit a high capacity and a good charge and discharge cycle characteristic.

When using the method of the invention, an electrode having such good characteristics as mentioned above can be readily mass-produced at low costs. This leads to the easy mass-production of secondary cells having a high capacity and a very good charge and discharge cycle characteristic at low costs.

The nonaqueous electrolyte secondary cell of the invention having a high capacity and a very good charge and discharge cycle characteristics can be utilized as a battery for portable electric appliances and electric cars, which should have a high energy density and should ensure a great number of repeated charge and discharge cycles.

PREFERRED EMBODIMENTS OF THE INVENTION

Electrode for Secondary Cells

Figure 1:
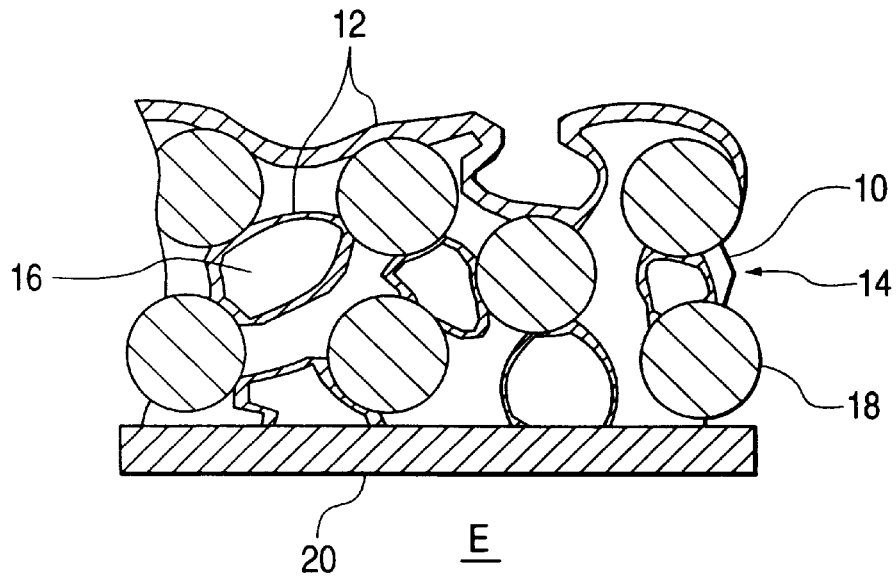
FIG. 1 is a schematic, enlarged view, partially in section, showing part of an electrode according to an embodiment of the invention.

Reference is now made to the accompanying drawings and particularly, to FIG. 1. In FIG. 1, there is schematically shown a part of an electrode E for secondary cells. The electrode E includes a carbon porous body or matrix 10, and a low crystallinity or amorphous carbon layer 12 formed on at least a part of the surfaces of the carbon porous matrix 10, thereby providing an active substance 14. The active substance 14 usually contains voids or pores 16 therein. The substance may be formed on a current collector 20. It is preferred that carbon particles 18 are uniformly dispersed and held in the carbon porous matrix 10 as shown.

The electrode E is not critical with respect to the shape and size thereof, and the shape and/or size may be determined depending on the type of secondary cell for which the electrode is used. The secondary cell to which the present invention is directed may be in the form of coins, buttons, cylinders, squares and the like. Thus, the shape and/or size of the electrode should be properly selected depending on the shape and/or size of the cell. The type of secondary cell to which the electrode of the invention is applicable is not critical. The electrode of the invention can be utilized in secondary cells such as nonaqueous electrolyte secondary cells. Because the electrode effectively undergoes a negative electrode reaction with lithium ions, it can be preferably applied to as a negative electrode of lithium secondary cells.

The carbon porous matrix 10 is formed by calcining or thermally heating a resin which is defined hereinafter. When a resin is calcined to carbonize the resin, the resultant body has a multitude of pores communicating with outside. Thus, the carbon porous body consists of a porous resin-carbonized product. The porosity and specific surface area of the product are not critical.

As described above, the carbon porous body should preferably have carbon particles made of crystalline carbon as individually dispersed and held therein. The presence of the carbon particles leads to an improved conductivity of the electrode and a high efficiency of an electrode reaction. The carbon particles useful in the practice of the invention should have a graphite structure having high crystallinity. Examples of the carbon particles include natural graphite, graphitized carbon and the like. The carbon particles are not critical with respect to their shape and may be in the form of spheres, bulks, flakes, fibers and the like. These carbon particles may be obtained according to any of known techniques.

If used, the carbon particles are not critical with respect to its size and should preferably have an average size of 8 to 15 $\mu$m. Using the carbon particles having the above defined size, a high electrode capacity and good charge and discharge cycle characteristics are ensured. If the size is too small or a specific surface area is too large, the amounts of the carbon porous body and the low crystallinity or amorphous carbon layer necessary for the coverage of individual carbon particles become too great, resulting in the lowering of an electrode capacity. In contrast, when the particle size is too great, such particles may pass through a separator, with the great possibility that short-circuiting takes place.

In order to make a small surface area and to permit a liquid electrolyte to be uniformly absorbed in and released from the electrode so that a high electrode capacity is realized, spherical or substantially spherical carbon particles should preferably be used.

To this end, the carbon particles should preferably be made of mesophase microbeads (MCMB). The mesophase microbeads are highly crystalline carbon particles of a spherical form having a graphite crystal structure. Thus, the above requirements are satisfied. The content of the carbon particles is preferably in the range of 60 to 96 wt %, more preferably 90 to 96 wt %, based on the total amount of the carbon particles, the carbon porous body, and the carbon layer.

The resins used for carbonization should preferably be carbonizable thermosetting resins. Thermosetting resins can be cured by heating. For the formation of an electrode, a resin is heated prior to calcination and cured, followed by calcination.

As will be described hereinafter, the thermosetting resins should preferably be at least one member selected from phenol resins, furan resins, and polyimide resins. After calcination, these resins can provide carbonized products with a high rate of a carbon residue, thus forming a carbon porous body having a high carbon content.

The low crystallinity or amorphous carbon layer should preferably be present in an amount of 1 to 10 wt % of the total amount of the carbon porous body and the carbon layer, within which the surfaces of the carbon porous body can be satisfactorily covered with the carbon layer.

When subjected to the Raman spectroscopy argon laser having a wavelength of 514.5 nm, the low crystallinity or amorphous carbon layer should preferably have a ratio between the intensity of a peak within a range of from 1350 to 1370 $cm^{-1}$ and the intensity of a peak within a range of from 1580 to 1620 $cm^{-1}$ of 0.4 to 0.8. Within this range of the ratio, the resultant electrode has a higher electrode capacity and better cycle characteristics.

The low crystallinity or amorphous carbon layer is preferably formed by thermal decomposition of a carbonizable gas. By the thermal decomposition of such a gas, a low crystallinity or amorphous carbon layer can be readily formed.

The carbonizable gas should preferably be at least one member selected from hydrocarbon gases and alcohol gases. Preferred examples of the hydrocarbon gas include aliphatic saturated hydrocarbons, aliphatic unsaturated hydrocarbons, aromatic hydrocarbons and mixtures thereof. Specific examples of the hydrocarbon include methane, propane, acetylene, propylene, benzene, toluene, xylene, naphthalene, perylene and mixtures thereof These hydrocarbons are so volatile that they can readily converted to gases. In addition, these gases are chemically relatively stable and are easy to handle. Examples of the alcohol include methanol, ethanol, and the like.

The electrode of the invention may be constituted of the active substance alone. It is preferred that the active substance is supported integrally with a current collector in a manner as described hereinafter. The current collector not only contributes to the transmission of electrons accompanied by an electrode reaction of the active substance, but also improves the mechanical strength of the electrode. The current collector should preferably have a high electric conductivity, and should preferably be made of copper, nickel, stainless steels (SUS) and the like.

Method for Making an Electrode for Secondary Cells

The electrode can be prepared according to a method which broadly comprises two steps including the step of forming a molding by use of a carbonizable resin and the step of calcining the molding and then thermally heating the resultant carbonized body in an atmosphere containing a carbonizable gas. These two steps are successively performed.

In the step of forming a molding by use of a resin, the resin may be in the form of a solid or a paste, which is determined depending on the molding method.

If carbon particles made of crystalline carbon are dispersed and held in a carbon porous body, a composition comprising carbon particles and a resin is initially prepared and is then molded in a desired form. The mixing ratio between the carbon particles and the resin should be determined while taking into account a rate of a carbon residue of the resin after calcination. Preferably, the carbon particles are present in the composition in an amount of 60 to 93 wt %.

For the preparation of a molding, a resin is dissolved in an organic solvent. If carbon particles are used, they are mixed with the resultant solution, followed by kneading to obtain a paste. The paste is molded or shaped by any of known procedures to obtain a molding having a desired form.

Preferably, the paste is applied onto a current collector to form a molding for electrode. This is particularly shown in FIG. 2, in which carbon particles 18 are dispersed in a resin 19 and the dispersion is applied onto a current collector 20. The thus applied paste is calcined to provide an electrode wherein the carbonized product is integrally formed with the current collector 20.

The resin used in the present invention should preferably be a thermosetting resin. The resin is preferably heated prior to the calcination step to cure the resin. This is because the cured resin which has been once shaped in a desired form is very unlikely to deform during the course of the calcination, permitting the thermal treatment to proceed easily.

Examples of the thermosetting resin include phenol resins, furan resins, polyimide resins and mixtures thereof. If carbon particles are used, the thermosetting resin is preferably used in amount of 7 to 40 wt % based on the total composition. The thermal curing is preferably carried out at a temperature of 150 to 280° C.

In the above procedure, a liquid resin is used although a solid resin may be used provided that it is readily dissolved in an organic solvent.

If a solid resin is used, the resin may be formulated with carbon particles and shaped in a desired form by pressing. For this purpose, a binder, such as polyvinylbutyral, may be added to the formulation.

In the next step, the molding is calcined to carbonize the resin, thereby providing a carbon porous body, followed by heating in an atmosphere containing a carbonizable gas. As a result, the gas is thermally decomposed to form a low crystallinity or amorphous carbon layer on at least a part of the surfaces of the carbon porous body.

Figure 3:
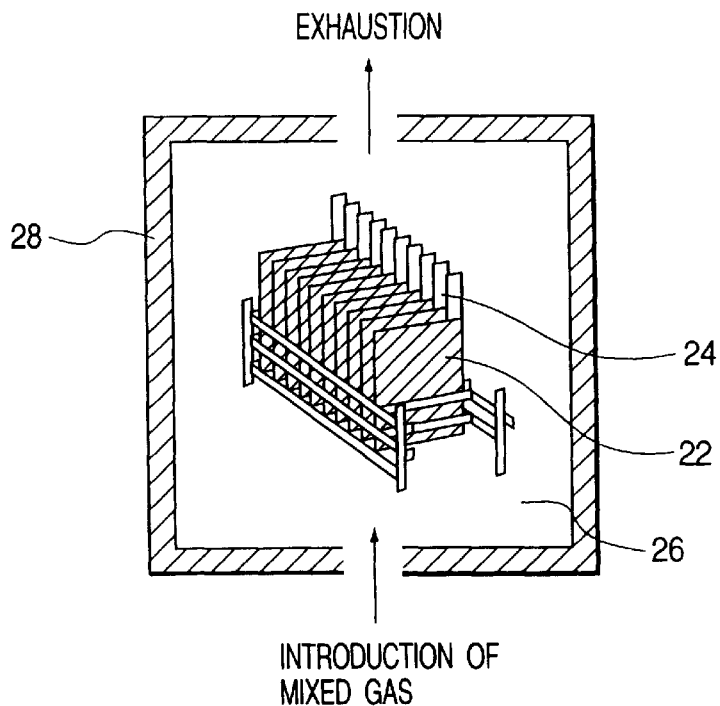
FIG. 3 is a schematic view illustrating a method of the invention.

This step is particularly shown in FIG. 3. In FIG. 3, the cured molding is subjected to blanking to obtain square-shaped electrode pieces 22 each attached with a lead 24. The pieces 22 are supported on an appropriate support 26 and placed in a vacuum furnace capable of reducing a pressure therein and elevating the temperature to 600° C. or higher, e.g. a vacuum carburization furnace 28, In a condition as shown in FIG. 3, the air in the furnace is evacuated to a pressure of 133 Pa or below, after which the atmosphere in the furnace is heated from room temperature to a temperature which is necessary for carbonizing the resin used. The temperature is maintained for 2.5 to 4 hours. During the course of the elevation of the temperature, the pressure in the furnace may be reduced. In this way, the molding is heated to an extent sufficient to be carbonized, thereby providing a carbon porous body.

The atmosphere wherein the resin is to be carbonized is not critical and the calcination is preferably effected in an atmosphere of an inert gas such as argon, nitrogen or the like or in a non-oxidative atmosphere or in vacuum. As mentioned above, the heating temperature depends on the type of resin to be carbonized and is generally in the range of 700 to 835° C.

Subsequently, while keeping the furnace temperature at a given temperature range defined above, a carbonizable gas is introduced into the furnace. The pressure in the furnace is increased to 5 to 30 kPa. Thereafter, the introduction of the gas is stopped and the gas in the furnace is evacuated to a given pressure. For the formation of a low crystallinity or amorphous carbon layer during the heating, the introduction and evacuation of the gas is usually repeated periodically thereby permitting a low crystallinity or amorphous carbon layer to be deposited on at least a part of the surfaces of the carbon porous body through decomposition of the carbonizable gas. The degree of the deposition can be appropriately controlled by controlling the number of the periodic repetitions, and the residence time of the carbonizable gas in the furnace.

In the above step, the carbonizable gas may not be critical and should preferably be selected from hydrocarbon gases and alcohol gases as mentioned hereinbefore. The hydrocarbons preferably include aliphatic saturated hydrocarbon such as methane, propane and the like, aliphatic unsaturated hydrocarbons such as acetylene, propylene and the like, and aromatic hydrocarbons such as benzene, toluene, xylene, naphthalene, perylene and the like. Examples of the alcohol include methanol, ethanol, and the like.

An inert gas such as nitrogen or argon may be added to the atmosphere containing a carbonizable gas. In this case, the content of a hydrocarbon or alcohol gas is not critical and is preferably in the range of 5 to 30 vol. % based on the total gas composition in the atmosphere. When treated in this way, a hydrocarbon or alcohol gas is thermally decomposed in an efficient manner to form a low crystallinity or amorphous carbon layer in a thickness sufficient to cover at least a part of the surfaces of the carbon porous body.

The heating temperature of the carbonized body in an atmosphere containing a carbonizable gas is not critical and is selected depending on the thermal decomposition temperature of the gas used for the decomposition. When using at least one member selected from methane, propane, acetylene, propylene, benzene, toluene, xylene, naphthalene and perylene, the carbon porous body is preferably heated to a temperature of not lower than 600° C. The hydrocarbon gas is thermally decomposed on contact with part of the surfaces of the carbon porous body and deposited in situ to form a low crystallinity or amorphous carbon layer. When using a current collector, the heating temperature should not exceed a melting point of a metal for the current collector.

Aside from the atmosphere for the formation of the carbon layer which contains at least one gas selected from hydrocarbon gases and alcohol gases, an atmosphere containing a carburizing gas such as carbon monoxide may also be used in the practice of the invention.

The thermal treatment step is feasible in a heating furnace which has a structure capable of charging and discharging a mixed gas containing a carbonizable gas. Examples of such a heating gas include a vacuum carburizing furnace or a gas carburizing furnace. When the mixed gas is charged and discharged intermittently or periodically, it becomes possible to form a low crystallinity or amorphous carbon layer in a satisfactory thickness on inner surfaces of voids of a carbon porous body communicating with outside.

Figure 5:
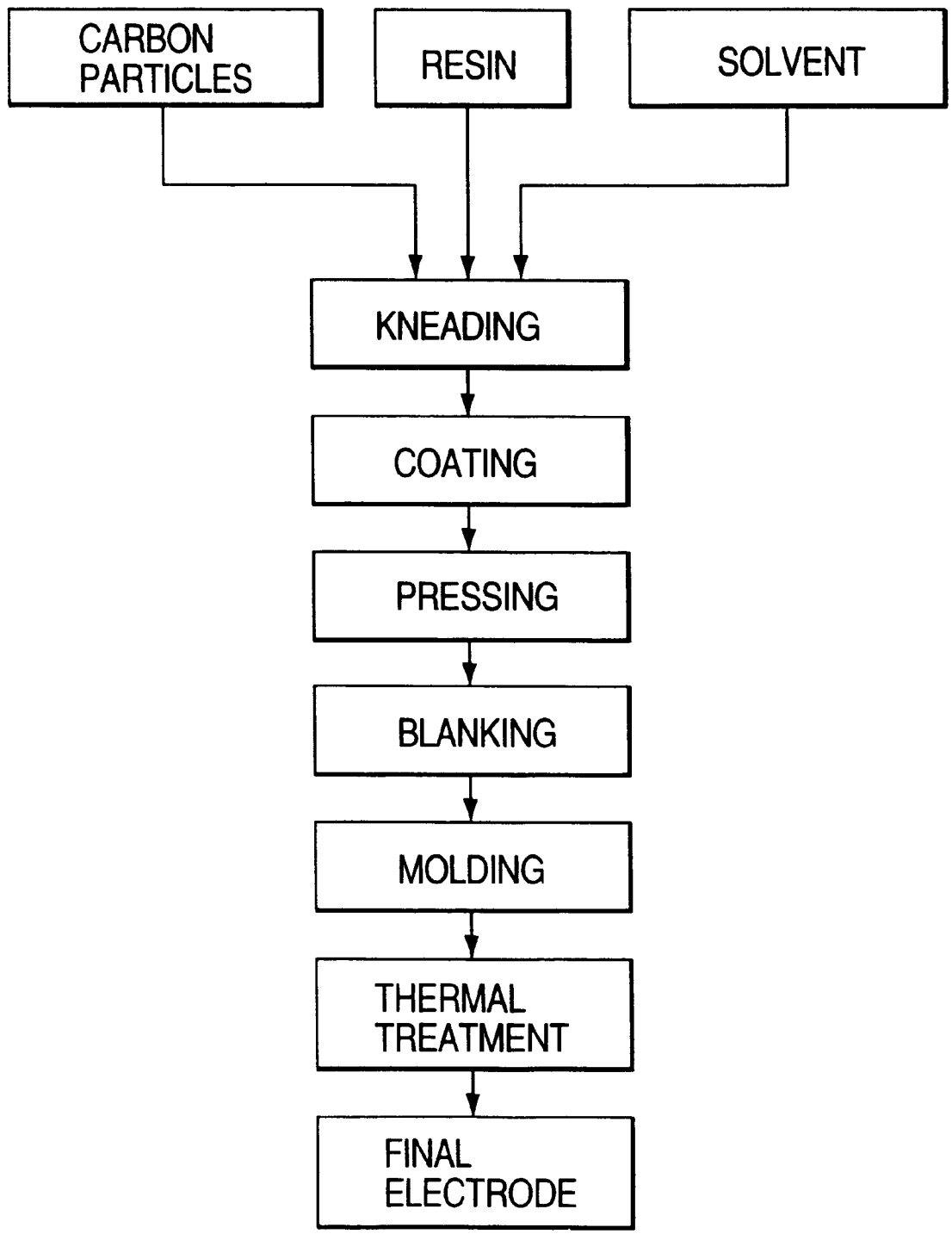
FIG. 5 is a flowchart showing a series of steps of fabricating an electrode of the invention according to a method of the invention.

The fabrication method of the invention is summarized in the flow chart shown in FIG. 5.

Nonaqueous Electrolyte Secondary Cells

The nonaqueous electrolyte secondary cell of the invention comprises at least a pair of electrodes, a separator, and a nonaqueous electrolyte impregnated in the separator wherein a negative electrode of the at least one pair of electrodes consists of the electrode defined hereinabove, i.e. the negative electrode is made of an active substance which comprises a carbon porous body and a low crystallinity or amorphous carbon layer formed on at least a part of the surfaces of the carbon porous body.

The nonaqueous electrolyte secondary cell is not critical with respect to the type thereof and may be of any types of known cells. Especially, lithium secondary cells are preferred because of its high discharge potential and high energy density. With lithium secondary cells, a positive electrode is made of an active substance made of a lithium-containing composite oxide such as $LiCoO_2$, $LiNiO_2$, $LiMn_2O_4$ or the like.

The secondary cell is not critical with respect to its shape and may be in the form of coins, buttons, cylinders, squares and the like, which may be determined depending on the purpose in end use. Other members including materials for a counter electrode, separators and the like may be not critical, and any known ones are usable in the practice of the invention.

The nonaqueous electrolyte is an electrolytic solution wherein an electrolyte or solute is dissolved in an organic solvent. It is preferred to use, as the nonaqueous electrolyte, mixtures of high dielectric constant solvents and electrolytes, or mixtures of mixed solvents of high dielectric constant solvents and low viscosity solvents and electrolytes. Using these types of nonaqueous electrolytes, the resultant cell exhibits a higher capacity and better cycle characteristics.

The high dielectric constant solvents include, for example, propylene carbonate (PC), ethylene carbonate (EC) and mixtures thereof. Examples of the low viscosity solvent include diethyl carbonate (DEC), dimethyl carbonate, methylethyl carbonate, 1,2-diethoxyethane, dimethyl ether and mixtures thereof. When a solvent of low viscosity is added, good low temperature characteristics are ensured. If a mixed solvent of a high dielectric constant solvent and a low viscosity solvent is used, the high dielectric constant solvent is preferably mixed in an amount of 40 to 60 vol. % based on the total solvent. If the amount of the high dielectric constant solvent is greater than 60 vol. %, the resultant electrolyte becomes viscous. On the other hand, when the amount is smaller than 40 vol. %, a salt is not dissociated satisfactorily, thus worsening load characteristics.

The electrolytes in the nonaqueous electrolyte may be selected depending on the type of cell. For instance, when a lithium secondary cell is made, Li salts are used as an electrolyte and include, for example, $LiPF_6$, $LiClO_4$, $LiBF_4$, $LiCF_3SO_3$, and the like. Of these, $LiPF_6$ is preferred because of its high electric conductivity. With an electrolyte containing a Li salt, it is preferred that a Li salt is dissolved at a concentration of 0.5 to 1.5 moles/liter.

Advantages and features of the electrode, its fabrication and secondary cells comprising the electrode are described below.

The electrode of the invention ensures a long-term electrode reaction in a high efficiency and at a high density, so that its electrode capacity is greater than known electrodes, with better cycle characteristics. Especially, when the electrode is applied to secondary cells comprising nonaqueous electrolytes, the characteristic features become pronounced for the following reasons.

(1) The electrode is composed of a carbon porous body and a low crystallinity or amorphous carbon layer formed on at least a part of the surface of the body, so that good conductivity is ensured and the porous body and the carbon layer both serve as an active substance, causing the electrode reaction to proceed very efficiently. Since the carbon porous body is strong, the strength of the electrode is great, thereby keeping a once shaped form over a long time.

(2) The carbon porous body has a multitude of voids communicating with outside. Accordingly, the electrode reaction takes place not only on the outermost surfaces of the body, but also on the inner surfaces of the voids wherein an electrolyte is impregnated. As a result, a reaction area per unit volume increases to cause an electrode reaction to proceed at a high density.

(3) The carbon particles and the carbon porous body are resistant to electrolytes, are free of corrosion, and are chemically stable. In addition, the surfaces of the carbon particles and the carbon porous body become more chemically stable by coverage with a low crystallinity or amorphous carbon layer. Thus, the electrode reaction proceeds over a long time in an efficient and highly dense manner.

(4) Where carbon particles made of crystalline carbon are dispersed and held in the carbon porous body, the carbon particles are covered at least partially with the carbon porous body on the surfaces thereof, so that the carbon particles are unlikely to directly contact with an electrolyte. Moreover, the low crystallinity or amorphous carbon layer formed on at least a part of the surfaces of the carbon porous body also covers therewith exposed portions of the carbon particles, which have not been covered with the carbon porous body. Thus, the surfaces of individual carbon particles are doubly covered with the carbon porous body and the low crystallinity or amorphous carbon layer. The contact between the carbon particles and the electrolyte is very unlikely to occur. In this way, the electrolyte is unlikely to decompose during the course of charge and discharge cycles.

The electrode having such good properties as set out above can be made simply, in large amounts and at low costs according to a method of the invention. This is for the following reasons.

(a) Resins used may be any known resin materials, which are readily available in large amounts at low costs. Where carbon particles made of crystalline carbon are dispersed and held in a carbon porous body, the resin serves as a binder for the carbon particles, thereby permitting a resin composition to be readily molded or shaped. In addition, it is not necessary to use any binder material which impedes electric conductivity. The resultant electrode has a further improved electrode capacity.

(2) In the course of the thermal treatment of a molding or a carbon porous body, a non-oxidative atmosphere or an atmosphere containing a carbonizable gas can be readily provided by use of a simple apparatus. The molding can be heated by a simple heating device, permitting the thermal treatment to be effected readily. It is very easy to increase the capacity of such an atmosphere as mentioned above or to provide a heating device of a larger heating capacity. Accordingly, a great number of moldings can be readily thermally treated at one time, and a great number of carbon porous bodies can be readily obtained in large amounts at low costs.

The nonaqueous electrolyte secondary cell of the invention makes use of the electrode as a negative electrode and exhibits a high capacity. This high capacity is maintained after repetition of a great number of charge and discharge cycles. Thus, the cell has a high capacity and very excellent cycle characteristics.

The invention is more particularly described by way of examples, which should not be construed as limiting the invention thereto. Comparative examples are also described.

EXAMPLE 1

An electrode of the type shown in FIG. 1 wherein carbon particles are dispersed in a carbon porous body and a current collector is used was made according to the following procedure.

Initially, MCMB (artificial graphite MCMB, commercially available from Osaka Gas Co., Ltd.) was provided as carbon particles and mixed with a resol-type phenol resin to prepare a composition comprising the carbon particles and the resin. For the preparation of the composition, MCMB and the phenol resin were formulated at a ratio by weight of 9:1. n-methyl-2-pyrrolidone (NMP) was added to the composition, followed by kneading to obtain a paste.

Figure 2:
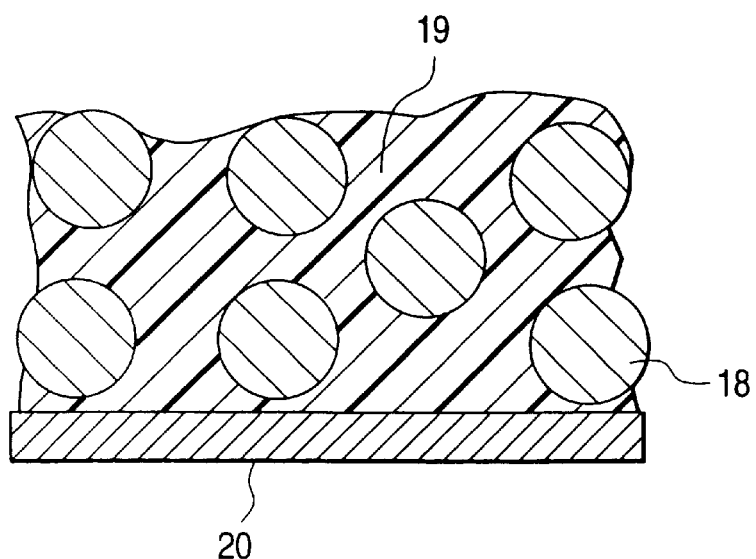
FIG. 2 is a schematic, enlarged view of part of a molding illustrating a method of the invention.

The paste was applied onto opposite sides of a current collector made of a patterned copper foil at a give portion thereof. The thus applied paste was dried and hot pressed under conditions of a compression pressure of 0.3 tons/cm$^2$, a temperature of 150° C. and a time of 15 seconds, thereby curing the phenol resin to obtain a molding. The molding was subjected to blanking in the form of a square electrode, to which a lead was attached. Thus, a molding in the form of a square electrode was obtained. The section of the molding is as shown in FIG. 2, from which it will be seen that the carbon particles are dispersed in the resin.

Next, a vacuum carburizing furnace which was able to reduce a pressure therein and could be heated to a temperature of 600° C. or above was provided, in which a plurality of moldings were placed. This is particularly shown in FIG. 3.

While keeping the moldings in a condition shown in FIG. 3, it was started to reduce the pressure in the furnace. When the pressure arrived at 100 Pa or below, it was also started to heat the atmosphere in the furnace from room temperature to 725° C. This furnace temperature was maintained for 0.5 hours. During the course of the heating of the atmosphere in the furnace, the pressure reduction was continued. It took 0.5 hours before the temperature was raised to 725° C. In this way, the moldings were heated by means of the hot furnace atmosphere, and the resin in the individual moldings was calcined and carbonized to obtain a carbon porous body.

Subsequently, while keeping the furnace temperature at 725° C., a mixed gas of propane used as a carbonizable gas and a nitrogen gas at a mixing ratio by volume of 1:4 was introduced into the furnace as shown in FIG. 3 to make a pressure of 30 kPa in the furnace. Thereafter, the introduction of the mixed gas was stopped, followed by evacuation from the top of the furnace to a pressure of 5 kPa.

Figure 4:
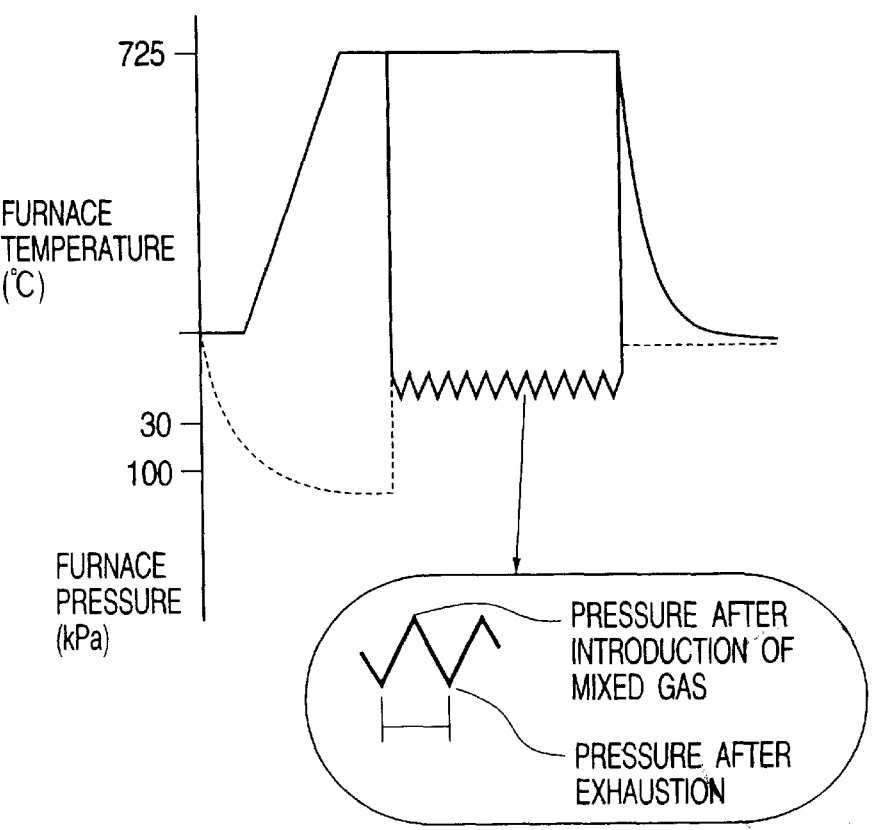
FIG. 4 is a graph showing the variations in heating temperature and atmospheric pressure in a furnace in relation to the variation in calcining time.

During the course of the heating at 725° C., the introduction and evacuation cycle of the mixed gas was repeated periodically 70 times, under which the moldings were maintained over 4 hours so that the propane gas was thermally decomposed to permit a low crystallinity or amorphous carbon layer to be deposited on the surfaces of the carbon porous body. In FIG. 4, there is shown a graph showing the variations of the heating temperature and the atmospheric pressure in the furnace in relation to the variation in calcination time of the above process.

Through the series of the steps set out above, there were obtained electrodes of the type shown in FIG. 1. These steps are summarized in the flow chart shown in FIG. 5.

Figure 6:
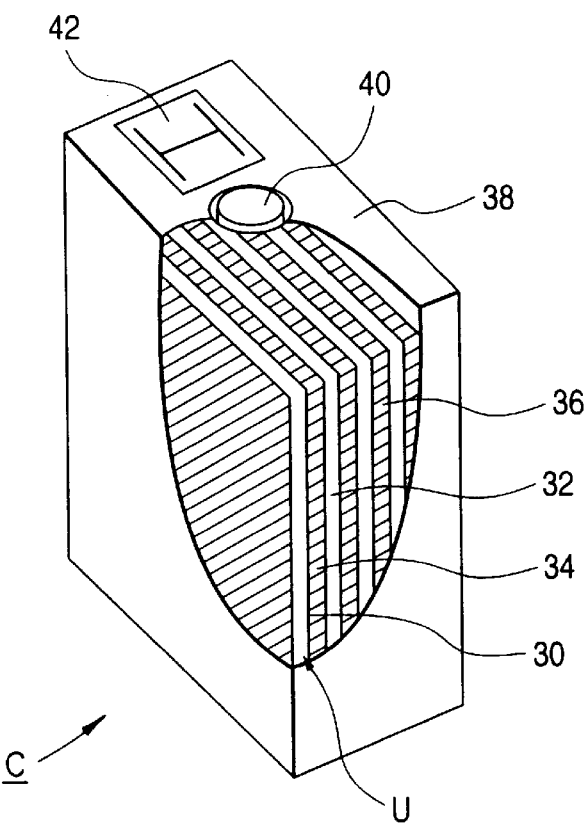
FIG. 6 is a schematic view showing an essential part of a nonaqueous electrolyte secondary cell using an electrode of the invention.

Using the thus obtained electrode as a negative electrode, a nonaqueous electrolyte secondary cell of a square form shown in FIG. 6 was made. In the figure, a cell C includes a cell unit U having, in fact, 17 pairs of negative electrodes 30 and positive electrodes 32 alternately arranged as shown, a separator 34 placed between adjacent electrodes 30, 32, and a liquid electrolyte 36 impregnated in the separator 34. The cell unit is encased in a casing 38 with a terminal for positive electrode 40. Reference numeral 42 indicates a safety valve.

The positive electrode 32 was made of LiCoO$_2$ serving as an active substance thereof, and artificial graphite was used as a conductive agent and an aluminium foil used as a current collector. In order to make the positive electrode, polyvinylidene fluoride (PVDF) was dissolved in N-methyl-2-pyrrolidone (NMP), to which LiCoO$_2$ and artificial graphite were added thereby obtaining a slurry. The thus obtained slurry was applied onto the current collector on opposite sides of the current collector according to a doctor blade method, followed by drying at 80° C. to provide a positive electrode 32.

A 25 μm thick porous polyethylene film was used as the separator 34. The liquid electrolyte used was a nonaqueous electrolyte which was composed of 1 mole/liter of a $LiPF_6$ solute and a mixed solvent of 25 vol. % of propylene carbonate, 25 vol. % of ethylene carbonate and 50 vol. % of diethylene carbonate. The casing 38 was electrically connected to leads for the negative electrodes 30 but was electrically insulated with the positive electrodes 32 at the terminal of the positive electrode through an insulating sealer. The insulating sealer for the positive electrodes could prevent leakage of the liquid electrolyte and could interrupt outside air therewith. The casing 38 had the safety valve 42, from which a gas could be escaped when generated in the casing, thus being good in safety.

Comparative Example 1

Square moldings were formed in the same manner as in Example 1 and were provided as an electrode without any calcination thermal treatment. The electrodes were used as negative electrodes, thereby making a nonaqueous electrolyte secondary cell.

Comparative Example 2

The moldings were formed and calcined in a non-oxidative atmosphere in the same manner as in Example 1, but was not heated in an atmosphere containing a carbonizable gas, thereby obtaining electrodes. The electrodes were used as a negative electrode to make a nonaqueous electrolyte secondary cell in the same manner as in Example 1.

EXAMPLE 2

Amorphous carbon particles (MGC, commercially available from Mitsubishi Gas Chem. Co., Ltd.) were mixed and kneaded with a phenol resin and N-methyl-2-pyrrolidone to obtain a paste. Then, the general procedure of Example 1 was repeated using this paste for forming moldings, thereby obtaining electrodes. The electrodes were used as a negative electrode to make a nonaqueous electrolyte secondary cell in the same manner as in Example 1.

Comparative Example 3

Moldings were formed in the same manner as in Example 1, followed by calcination in a non-oxidative atmosphere in the same manner as in Example 1. However, heating in an atmosphere containing a carbonizable gas was not effected to obtain electrodes. A nonaqueous electrolyte secondary cell was made in the same manner as in Example 1 using the electrodes as a negative electrode.

Comparison of an Initial Capacity and a Charge and Discharge Cycle Characteristic The secondary cells obtained in Examples 1, 2 and Comparative examples 1 to 3 were each subjected to measurement of an initial capacity at room temperatures. For the measurement of an initial capacity, a charge current per unit electrode area was set at 260 mA, and a constant current discharge was effected from 4.2 V to 3.0 V. The results of the measurement of the initial capacity are shown in FIG. 7.

Figure 7:
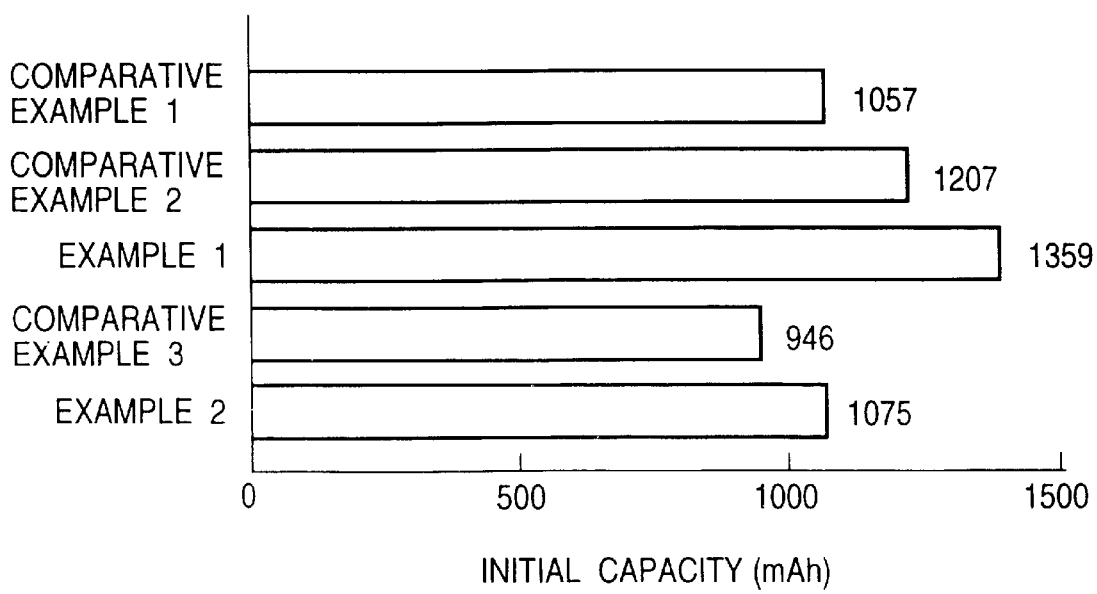
FIG. 7 is a bar graph showing initial capacities of the nonaqueous electrolyte secondary cells obtained in Examples 1, 2 and Comparative Examples 1 to 3.

FIG. 7 reveals that the secondary cell obtained in Example 1 has an initial capacity which is 1359 mAh and is higher by 12.5 to 28.5% than those capacities of Comparative Examples 1, 2.

Moreover, the secondary cell obtained in Example 2 has an initial capacity higher by 13.6% than the capacity attained in Comparative Example 3.

Figure 8:
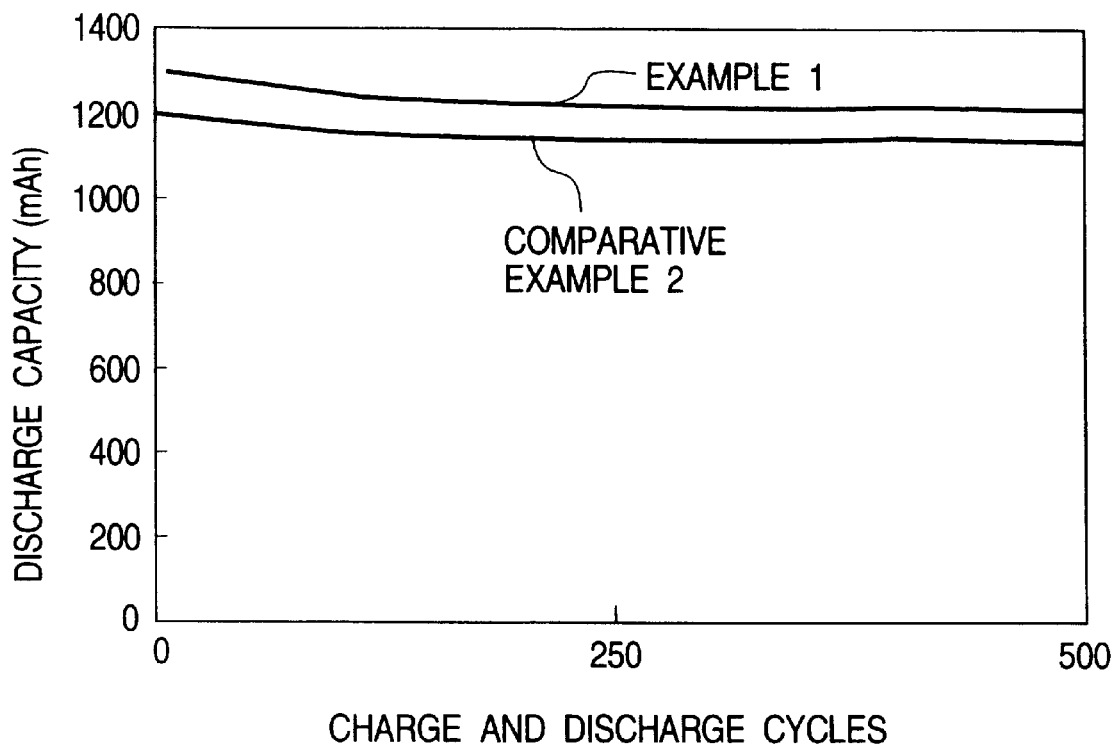
FIG. 8 is a graph showing a discharge capacity in relation to the variation in the charge and discharge cycles of nonaqueous electrolyte secondary cells obtained in Example 1 and Comparative Example 1.

The secondary cells obtained in Example 1 and Comparative Example 1 were, respectively, subjected to a charge and discharge cycle test between 2.0 and 4.2 V at a current per unit electrode area of 400 mA. In this test, the charge and discharge cycles were repeated 500 times wherein a capacity in every cycle was measured. The results of the measurement of the capacity in every cycle were shown in FIG. 8, revealing that the cell of Example 1 keeps a capacity higher than that of Comparative Example 2 when 500 charge and discharge cycles were repeated, thus exhibiting a good charge and discharge cycle characteristic.

In view of the results on the initial capacity and the charge and discharge cycle characteristic, it will be seen that an electrode, wherein a low crystallinity or amorphous carbon layer is formed on at least a part of the surfaces of a carbon porous body, exhibits a high electrode capacity and a good charge and discharge cycle characteristic. It will also be apparent that nonaqueous electrolyte secondary cells using the electrode exhibit a high capacity and an improved charge and discharge cycle characteristic.

EXAMPLE 3

Figure 9:
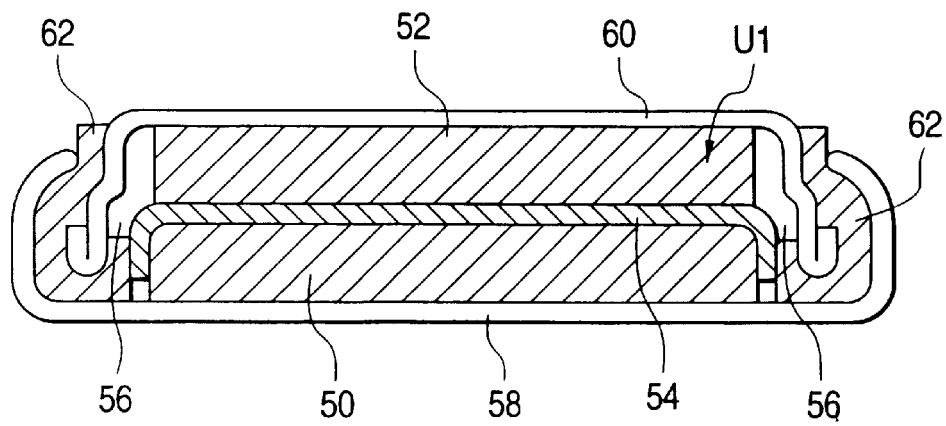
FIG. 9 is a schematic longitudinal section of a nonaqueous electrolyte secondary cell made in Example 3.

The general procedure of Example 1 was repeated except that a paste of carbon particles and a resin was prepared and was formed in the form of a coin-shaped electrode in the same manner as in Example 1. The coin-shaped electrode was used as a negative electrode of a coin-shaped nonaqueous electrolyte secondary cell shown in FIG. 9. In FIG. 9, there is shown a lithium secondary cell C1 capable of uniform storage and release of lithium ions in an electrode. The cell C1 includes a negative electrode 50, a positive electrode 52, a separator 54 provided between the electrodes 50, 52, and a nonaqueous liquid electrolyte 56, thereby forming a cell unit U1. The unit U1 is encased in an negative electrode can 58 and a positive electrode can 60, which are air-tightly assembled through an insulating gasket 62.

The positive electrode 52 was made of $LiCoO_2$ serving as an active substance for positive electrode and artificial graphite used as a conductive agent. The separator 54 was made of a porous polyethylene film. The nonaqueous liquid electrolyte 565 was composed of 1 mole/liter of a $LiPF_6$ solute dissolved in a mixed solvent of 25 vol. % of propylene carbonate, 25 vol. % of ethylene carbonate and 50 vol. % of diethyl carbonate.

The resultant cell was subjected to measurements of an initial capacity and a charge and discharge cycle characteristic, revealing that a high initial capacity and a good charge and discharge cycle characteristic were obtained, like Example 1.

What is claimed is:

1. An electrode for nonaqueous electrolyte secondary cells which comprises, as an active substance therefor:
    a carbon porous body;
    particles made of crystalline carbon and dispersed and held in said carbon porous body; and
    a low crystallinity or amorphous carbon layer formed on at least a part of surfaces of the carbon porous body, whereby said carbon particles are individually covered on the surfaces thereof with said carbon porous body and said carbon layer.

2. An electrode according to claim 1, wherein said carbon particles are present in an amount of 60 to 96 wt % of the active substance.

3. An electrode according to claim 1, wherein said carbon particles have an average size of 8 to 15 μm.

4. An electrode according to claim 1, wherein said carbon particles consist of mesophase microbeads.

5. An electrode according to claim 1, wherein said carbon porous body is derived from a carbonizable resin.

6. An electrode according to claim 5, wherein said resin is at least one thermosetting resin selected from the group consisting of phenol resins, furan resins and polyimide resins.

7. An electrode according to claim 1, wherein said carbon layer is present in an amount of 1 to 10 wt % based on said active substance.

8. An electrode according to claim 1, wherein said carbon layer has a ratio of an intensity of a peak in the range of 1350 to 1370 $cm^{-1}$ to an intensity of a peak in the range of 1580 to 1620 $cm^{-1}$ of 0.4 to 0.8 when subjected to the Raman spectroscopy using an argon laser having a wavelength of 514.5 nm.

9. An electrode according to claim 1, wherein said carbon layer is derived from a carbonizable gas.

10. An electrode according to claim 1, wherein said gas consists of at least one member selected from the group consisting of hydrocarbons and alcohols.

11. An electrode according to claim 10, wherein said gas consists of at least one hydrocarbon selected from the group consisting of aliphatic saturated hydrocarbons, aliphatic unsaturated hydrocarbons, and aromatic hydrocarbons.

12. An electrode according to claim 11, wherein said at least one hydrocarbon is selected from the group consisting of methane, propane, acetylene, propylene, benzene, toluene, xylene, naphthalene, perylene and mixtures thereof.

13. An electrode according to claim 1, further comprising a current collector integrally combined with said active substance.

14. An electrode according to claim 1, wherein said carbon particles are individually made of high crystalline graphite.

15. A nonaqueous electrolyte secondary cell which comprises an electrode defined in claim 1 as at least one negative electrode thereof.

16. A nonaqueous electrolyte secondary cell according to claim 15, wherein said cell comprises a liquid electrolyte consisting of a member selected from the group consisting of a mixture of a high dielectric constant solvent and an electrolyte, and a mixture of a mixed solvent of a high dielectric constant solvent and a solvent of low viscosity and an electrolyte.

17. A method for making an electrode for secondary cells wherein said electrode comprises:
an active substance therefore;
a carbon porous body;
particles made of crystalline carbon and dispersed and held in said carbon porous body; and
a low crystallinity or amorphous carbon layer formed on at least a part of surfaces of said carbon porous body;
said method comprising:
providing a resin molding in a desired form;
carbonizing the molding to obtain a carbon porous body;
heating said carbon porous body in an atmosphere containing a carbonizable gas so that said gas is thermally decomposed to deposit a low crystallinity or amorphous carbon layer on at least a part of the surface of said carbon porous body, whereby said carbon particles are individually covered on the surfaces thereof with said carbon porous body and said carbon layer.

18. A method according to claim 17, wherein said resin molding is made of as thermosetting resin, and is cured prior to the carbonization.

19. A method according to claim 17, wherein said carbonizable gas is at least one member selected from gases of hydrocarbons and alcohols.

20. A method according to claim 19, wherein said carbonizable gas consists of at least one hydrocarbon selected from the group consisting of methane, propane, acetylene, propylene, benzene, toluene, xylene, naphthalene, and perylene, and said molding is heated at temperatures not lower than 600° C. in the atmosphere.

21. A method according to claim 17, wherein said carbonizable gas is present in an amount of 5 to 30 vol. % in the atmosphere.

22. A method according to claim 17, wherein said resin molding is formed by dissolving a resin in an solvent therefor, applying the resultant solution to a current collector, and calcining the thus applied solution to provide a carbon porous body integrally combined with said current collector.

23. A method according to claim 22, further adding carbon particles to the solvent and kneading the mixture to provide a paste prior to the application to the current collector.

24. A method according to claim 17, wherein said carbon particles are individually made of highly crystalline graphite.

25. A nonaqueous electrolyte secondary cell which comprises:
at least a pair of electrodes;
a separator provided between the at least a pair of electrodes; and
a nonaqueous electrolyte impregnated in the separator, wherein a negative electrode of the at least a pair of electrodes is made of an electrode which comprises, as an active substance therefor:
a carbon porous body;
particles made of crystalline carbon and dispersed and held in said carbon porous body; and
a low crystallinity or amorphous carbon layer formed on at least a part of surfaces of the carbon porous body, whereby said carbon particles are individually covered on the surfaces thereof with said carbon porous body and said carbon layer.

26. A nonaqueous electrolyte secondary cell according to claim 25, wherein said nonaqueous electrolyte consists of a member selected from the group consisting of a mixture of a high dielectric constant solvent and an electrolyte, and a mixture of a mixed solvent of a high dielectric constant solvent and a solvent of low viscosity and an electrolyte.

27. A nonaqueous electrolyte secondary cell according to claim 25, wherein said carbon particles are individually made of highly crystalline graphite.

* * * * *